Feb. 6, 1934.  O. G. MANDT  1,946,222
DISCHARGE CHUTE FOR MIXERS
Filed May 20, 1932
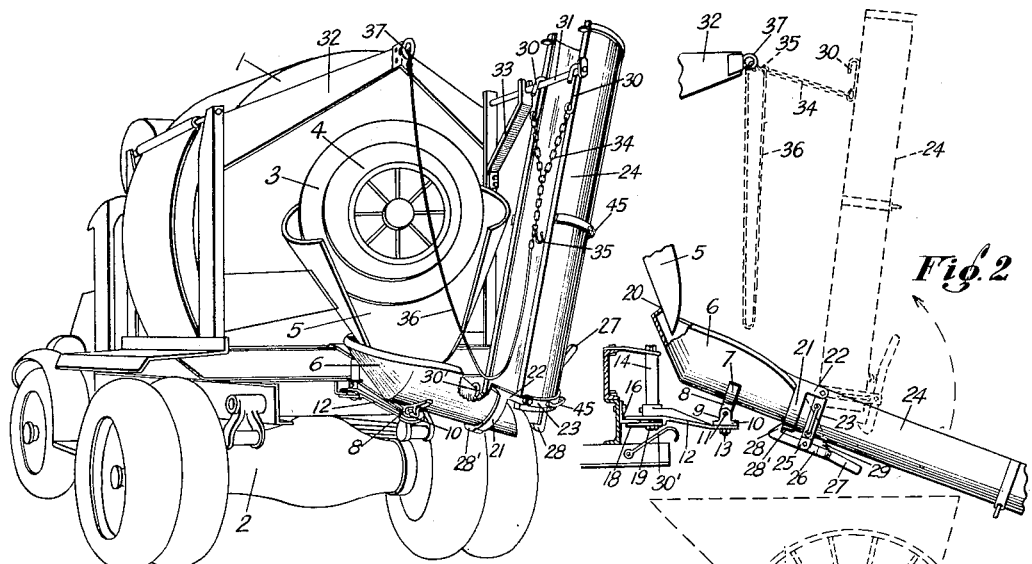
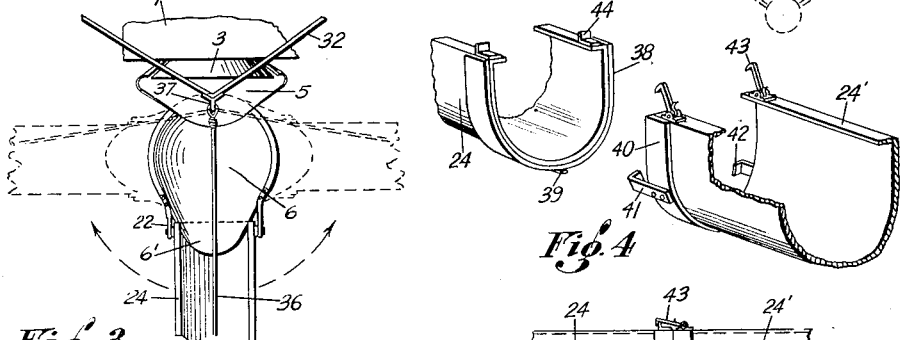
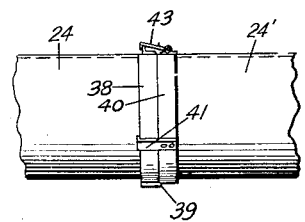
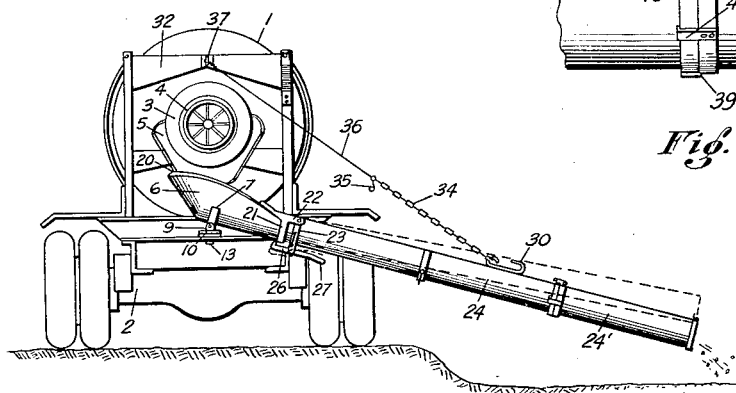
INVENTOR.
Obert G. Mandt.
BY
ATTORNEYS.

Patented Feb. 6, 1934

1,946,222

UNITED STATES PATENT OFFICE

1,946,222

DISCHARGE CHUTE FOR MIXERS

Obert G. Mandt, Columbus, Ohio, assignor to The Jaeger Machine Company, Columbus, Ohio, a corporation of Ohio Application May 20, 1932. Serial No. 612,527

5 Claims. (Cl. 193—10)

My invention relates to discharge chutes for mixers. It has to do, more particularly, with a discharge chute for a mixer for concrete, or other similar materials, and is especially applicable to mixers which are designed to be mounted upon a truck chassis or trailer and adapted to mix the materials while hauling them to the job, although it is not necessarily limited thereto.

It has been customary heretofore to provide a discharge chute for mixers of the type indicated which is carried on the running board of the mixing unit, when not in use. It requires two men to handle this discharge chute and to mount it in the desired position for discharging the material therethrough. It will be obvious that every time it is desired to discharge the contents of the mixer it is necessary to remove the discharge chute from the running board and to mount it in discharge position. Likewise, when the mixer has discharged its contents, it is necessary to remove the chute from discharge position and again mount it on the running board. Thus, considerable time is required for mounting the discharge chute in operative position and in inoperative position and for changing it between these two positions. Since so much time is required for changing the chute from one position to the other and since the chute is so unwieldy and requires two men to handle it, a considerable amount of both time and labor is lost.

Discharge chutes which have been used with mixers of the type indicated, are also possessed of other undesirable features. For instance, with prior art discharge chutes it is only possible to deliver at one point. If it is desired to deliver at different points it is necessary to use different lengths of discharge chutes. Furthermore, if it is desired to deliver in a hopper or other container below the discharge opening, it is necessary to first remove the discharge chute. If the container or hopper is not of sufficient height when the concrete or other material is discharged therein, this concrete will splash and fly in all directions and part of the material will be lost, an obviously undesirable occurrence.

One of the objects of my invention is to provide a discharge chute for mixers of the type indicated, which is mounted on the mixer and which may be rendered operative or inoperative with a minimum of time and labor.

In its preferred form, my invention contemplates the provision of a discharge chute for mixers of the type indicated which is mounted at the discharge end of the mixer in such a manner that it can be readily moved to operative or inoperative position. This chute comprises a short section which is mounted directly below the gathering chute or apron of the mixer and which is so mounted that it may be swung either laterally or in a vertical plane. A long section of the chute is pivotally connected to the short section in such a manner that it may be swung in a vertical plane. Means is provided for swinging the long section of the discharge chute to vertical inoperative position and for retaining it in such position. The chute is of such a structure that when the long section is in substantially vertical position the material may be discharged from the short section without interference. I have also provided means for connecting other sections to the long section of the discharge chute in order to produce a chute of any desired length.

The preferred embodiment of my invention is shown in the accompanying drawing wherein similar characters of reference designate corresponding parts and wherein:

Figure 1 is a perspective view of a truck mixer having a discharge chute, made in accordance with my invention, mounted thereon.

Figure 2 is a partial detail side elevation showing, in full lines, my discharge chute in operative position and showing, in dotted lines, how the long section of the discharge chute may be swung to inoperative position so that material may be discharged from the short section of the chute.

Figure 3 is a plan view showing how my discharge chute may be swung to various positions.

Figure 4 is a detail perspective view showing sections of my chute ready for connection together.

Figure 5 is another detail showing sections of my chute connected together.

Figure 6 is a rear elevation of a truck mixer having a chute made in accordance with my invention mounted thereon, said chute being composed of several sections.

With reference to the drawing, I have shown a truck mixer on which my discharge chute is mounted, although it will be understood that it may be mounted on other types of mixers. The truck mixer comprises a mixing unit 1 mounted on a truck chassis 2. This mixing unit is provided with a discharge opening 3 provided with a closure 4 therefor. A gathering chute or apron 5 is mounted adjacent the discharge opening and is adapted to gather the material as it is discharged and to direct it into the discharge chute.

Directly below the gathering chute 5, I mount a short chute section 6. This short chute section 6 is preferably of substantially the shape of a scoop, as will be apparent from the drawing. It is provided on its under surface with a strap 7 which is suitably secured thereto. This strap is provided with spaced depending lugs 8 having apertures therein adapted to align with apertures formed in spaced lugs 9 on a plate 10. A pin 11 extends through the said apertures to join the strap 7 to the plate 10. The plate 10 may be pivotally mounted on the outer end of an arm 12 by means of a pivot pin 13 which is formed on the under surface of the plate and projects through an opening in the arm 12. It will be obvious that the short chute section 6 is so mounted on the arm 12 that it may be swung laterally or in a vertical plane.

The inner end of the arm 12 is mounted upon an upstanding pin 14. It is clamped against lateral swinging about said pin. This is effected by means of a clamping jaw 18 mounted on said pin beneath the arm 12 and cooperating with this arm to embrace a bracket 16 which is secured to the truck chassis and projects forwardly therefrom. A nut 19 is provided on the lower end of the pin 14 and the tightening of this nut will serve to clamp the bracket 16 between the arm 12 and the clamping jaw 18. It will be apparent that other means may be used for connecting the arm 12 to the truck chassis, if desired.

The upper end of the short chute section 6 is provided with a bearing surface 20 which is adapted to bear against the rear surface of the gathering chute 5 to resist downward movement of the outer end of the chute under certain conditions of operation, as will be hereinafter apparent. The outer end of the short chute section 6 is provided with a strap member 21 which is suitably mounted on the under surface thereof. This strap member is provided with arms 22 at each side of the chute and projecting from such strap member. The outer ends of these arms 22 are pivoted to the upper ends of a strap member 23 which is mounted on the upper end of the body portion 24 of the long chute section. As shown in Figure 3, the short chute section 6 is provided with a projecting portion 6' which overlaps the long chute section 24, for a purpose hereinafter explained.

The lower portion of the strap member 23 is provided with projecting lugs 25 within which is pivotally mounted a latch member 26. This latch member may be of a common type and is provided with a handle 27 and a locking lug 28. A compression spring 29 is mounted between the handle portion 27 and the under surface of the body portion 24 of the long chute section. It will be obvious that the body portion 24 may be swung from inoperative position, shown by the dotted lines in Figure 2, to operative position, shown by the full lines in this figure.

When swinging the body portion 24 into operative position, after it reaches a certain position, the locking lug 28 will contact with a lug 28' on the strap member 21. The spring 29 will be compressed and the locking lug 28 will ride over the lug 28' of the strap member 21 and into latching engagement therewith. To release the latch it is merely necessary to pull up on the handle 27, and the body portion 24 of the long chute section may then be swung into inoperative position. It will be obvious that other latches may be used and other forms of pivotal connections between the member 4 and the short chute section 6 may be employed.

Adjacent the outer end of the body portion 24 and on the upper edges thereof, a pair of hooks 30 are mounted. These hooks may be welded or otherwise secured to the body portion 24. When the body portion 24 is swung to inoperative position as shown in Figure 1, it may be lifted slightly so that the hooks 30 may be slipped over the outer end of a rod 31. In this lifting movement, the outer end of the short chute section swings upwardly about the pivot pin 11. Thus, the body portion 24 of the chute may be hung on the rod 31 when the truck moves from place to place. The body portion 24 of the chute is preferably provided with handles 45, one being disposed at the lower end thereof and the other being disposed intermediate the ends thereof. These handles facilitate engagement and disengagement of the hooks 30 with rod 31.

The inner end of the rod 31 is supported by the support 32 of the mixing unit. A projecting arm 33 is also provided for supporting this rod a suitable distance from its inner end. A Y-shaped chain 34 is connected to the hooks 30 and the free end of this chain carries a hook 35. A cable 36 has its one end connected to the chain 34 and its inner end connected to a ring 37 mounted on the support 32 of the mixing unit. The functions of the chain and the cable will be hereafter explained.

In Figures 4 and 5 I have shown means for connecting the various long chute sections of my discharge chute together when a plurality of sections are used. As shown in these Figures, the end of a section is provided with a strap member 38. This strap member has a projecting lug 39 disposed on its under surface.

The adjacent section 24' is provided with a strap member 40 disposed on the adjacent end thereof. This strap member has a resilient bracket 41 suitably secured at each side thereof. These brackets are provided with inwardly projecting lugs 42 on the outer ends thereof. It will be understood that the section 24' will rest on the lug 39 and that the brackets 41 will cooperate with the strap member 24 in holding the two adjacent sections together, as shown in Figure 5. The section 24' may also be provided, on the upper edges thereof, as shown, with a pair of pivoted latch members 43 which cooperate with lugs 44 on the upper edges of the member 24 to serve as an additional means for securing these members together.

It will be obvious that my discharge chute may consist of any number of these sections and that similar means may be employed for connecting all of the various sections together. However, if desired, other means may be used for joining the various sections together.

In operation when the mixer is traveling from place to place the long chute section is disposed as shown in Figure 1. When the mixer reaches the point where it is desired to discharge the material, the long chute section is lifted slightly so that the hooks 30 will be disengaged from the rod 31. One man will be able to release the long chute section and to lower it into delivery position. The engagement and disengagement of the hooks 30 with the rod 31 is facilitated by the fact that the short chute section 6 is mounted in such a manner that it may swing in a vertical plane. After the hooks 30 are disengaged and the body portion 24 is lowered into position, the latch member 26 will operate to lock the portion 24 to the short chute section and to hold it rigidly with relation thereto, and with the delivery end of the short chute section overlapping the long chute section.

When the portion 24 is lowered into operative position, without having additional sections attached thereto, it will be partially supported by the chain 34 and the cable 36. It will, however, be further supported by the contact of the bearing surface 20 of the short chute section with the under surface of the gathering chute 5.

When it is desired to dump into small containers disposed below the discharge end of the mixer, the body portion 24 of the chute may be raised to the position shown in Figure 1 and locked in such position by engaging the hooks 30 with the rod 31. It will be understood that the short chute section extends to a considerable distance below the lower end of the gathering chute 5 and will convey the discharged materials into the container without splashing or scattering of such material. If it is desired to discharge from the short chute section at positions other than that shown in Figure 1, the body portion 24 is raised from operative position and the hook 35 disposed on the end of chain 36 is engaged with the ring 37. It will be seen that the body portion 24 will be in inoperative position and will not interfere with the discharge of the material from the short chute section. When the long chute section is in this position the bearing surface 20 will contact with the rear surface of the gathering chute 5 and will aid in supporting the weight of the long chute section and the short chute section. It will also be obvious that when the chute is so positioned it may be swung to any desired position so that material may be discharged from the short chute section at any desired point behind the truck.

It will be obvious that in some cases it will be necessary to discharge the material at a point farther away from the truck than the length of the body portion 24 of the chute. In such an instance, one or more sections 24' are added in order that discharge may be effected at the desired point. It will also be apparent that when the body portion 24 only is used the cable 36 and chain 34 will support the outer end thereof above the ground so that the long chute section may be swung to any desired position within an angle of 180°, as shown in Figure 3. If several sections are used the cable may be adjusted, as to length, in order to position the extreme lower end of the chute above the ground so that the chute may be swung to any desired position in order to effect discharge of material, as shown in Figure 6. When several sections are used the latch member 26 is released so that when the outer end of the body portion of the chute is raised it will pivot about its point of connection to the short chute section 6. It will be obvious that in such an instance the bearing 20 will contact with the gathering chute 5, thereby supporting the inner end of the discharge chute while the outer portion of the chute will be supported in any adjusted position by means of cable 36 and chain 34. Since the short chute section 6 is provided with the portion 6' which overlaps the long chute section 24 this relative adjustment between these two members will be permitted.

When all the material has been discharged from the mixer, if several sections of the discharge chute are used, the extra sections are removed from the member 24. Then the latch 26 is released and the body portion 24 is swung into a substantially vertical position. The entire discharge chute is then raised slightly, and the hooks 30 hooked over the rod 31, it being understood that the discharge chute has been previously swung laterally to the correct position relative to the rod 31. When the chute occupies the position shown in Figure 1, the truck mixer may be moved from place to place and the chute will be suitably disposed during transportation. I have also provided a hook 30' (Figures 1 and 2) which is mounted on the truck chassis adjacent the lower end of the chute and is adapted to hook over the edge of the short chute section and to rigidly hold the lower end of the short chute section against upward or lateral movement during transportation to also maintain the hooks 30 of the long chute section in engagement with the rod 31.

It will be seen from the above description that I have provided a discharge chute for mixers of the type indicated having many desirable features. For instance, it will not be necessary to wholly remove my discharge chute from the mixer after discharge has been effected and to mount it on another portion of the mixer. On the contrary, it is only necessary to swing the chute from operative position to inoperative position. It will also be obvious that this shifting of the chute from one position to the other may be accomplished by one man in a minimum of time. Furthermore, a portion of my discharge chute may be used for discharging directly into small containers disposed below the discharge end of the mixer without splashing or scattering of the discharge material and without removing the main portion of the chute from the discharge end of the mixer. Likewise, containers, such as batch carts or hoppers, may be positioned at the discharge end of the mixer, so that they will receive the discharged concrete, without interference of the containers or carts with the truck itself. It will also be apparent that any number of sections may be added to my discharge chute in order to effect discharge at any desired point.

Having thus described my invention, what I claim is:

1. A discharge chute for a mixer comprising a receiving section mounted below the discharge opening of the mixer, said receiving section being mounted in such a manner that it may be swung laterally in a wide arc or tilted in a vertical plane, means for hingedly connecting said receiving section to the main section of the chute, said main section being swingable between operative position and inoperative position so that the material may be discharged either from the lower end of the main section or from the lower end of the receiving section, means for supporting the discharge chute in such a manner that it may be swung laterally when the main section of the chute is in operative or inoperative position, and means independent of said last-named means for rigidly supporting the discharge chute on the mixer for transportation while still maintaining connection of said discharge chute to the discharge end of the mixer, said last-named means being adapted to support the main section of the chute in an inoperative position in such a manner that material may be discharged from the receiving section without interfering with the main section when the entire chute is supported in position for transportation.

2. A discharge chute for mixers comprising a receiving chute section mounted below the discharge opening of the mixer in such a manner that it may be swung laterally in a wide arc or tilted in a vertical plane, said receiving section being hingedly connected to the main section of the chute, said receiving section being adapted to be swung laterally until it lies transversely of said mixer and said main section being adapted to be disposed substantially at right angles to said receiving section so that the discharge chute may be mounted for transportation while still being connected to said mixer, means for rigidly supporting the discharge chute in such position for transportation, said means comprising hook members on said main section adapted to fit over a rearwardly extending supporting member disposed on said mixer, and means for maintaining said hook members in engagement with said supporting member.

3. In combination with a truck mixer or the like, a discharge chute comprising a short chute section mounted directly below the discharge opening of the mixing receptacle and adapted to receive the material discharged therefrom, said short chute section being mounted in such a manner that it may be swung laterally in a wide arc but will always be so disposed that it will receive the material discharged from said mixing receptacle, a main section of chute connected to said short chute section, said main section being swingable between operative position and inoperative position, means for supporting the entire discharge chute in such a manner that it may be swung laterally when the main section of the chute is in operative or inoperative position, and means independent of said last-named means for rigidly mounting the discharge chute on the mixer for transportation while the discharge chute is still connected to the discharge end of the mixer and while still maintaining said short chute section in position to receive material discharged from said mixer.

4. In combination with a truck mixer or the like, a discharge chute comprising a short chute section mounted directly below the discharge opening of the mixing receptacle and adapted to receive the material discharged therefrom, said short chute section being so mounted that it may be swung in a vertical plane or laterally in a wide arc but will always be so disposed that it will receive the material discharged from the mixing receptacle, said short chute section being hingedly connected to a main section of the discharge chute, means for rigidly holding said main section and said short section with relation to each other when they are in alignment, said main section being swingable between operative and inoperative position, means for supporting the entire discharge chute in such a manner that it may be swung laterally when the main section is in operative or inoperative position, and means independent of said last-named means for rigidly mounting said discharge chute on the mixer for transportation while still maintaining connection of the chute to the discharge end of the mixer and the short chute section in position to receive the material discharged from the mixer.

5. In combination with a truck mixer or the like, a discharge chute mounted directly below the discharge opening of the mixing receptacle and adapted to receive the material discharged therefrom, said discharge chute being connected to the mixer in such a manner that it may be swung laterally in a wide arc but will always be so disposed that it will receive the material discharged from the mixing receptacle, means for supporting the entire discharge chute for lateral swinging, and means independent of said last-named means for rigidly mounting the discharge chute on the mixer for transportation while the discharge chute is still connected to the mixer in position to receive material discharged from the mixer.

OBERT G. MANDT.